UNITED STATES PATENT OFFICE.

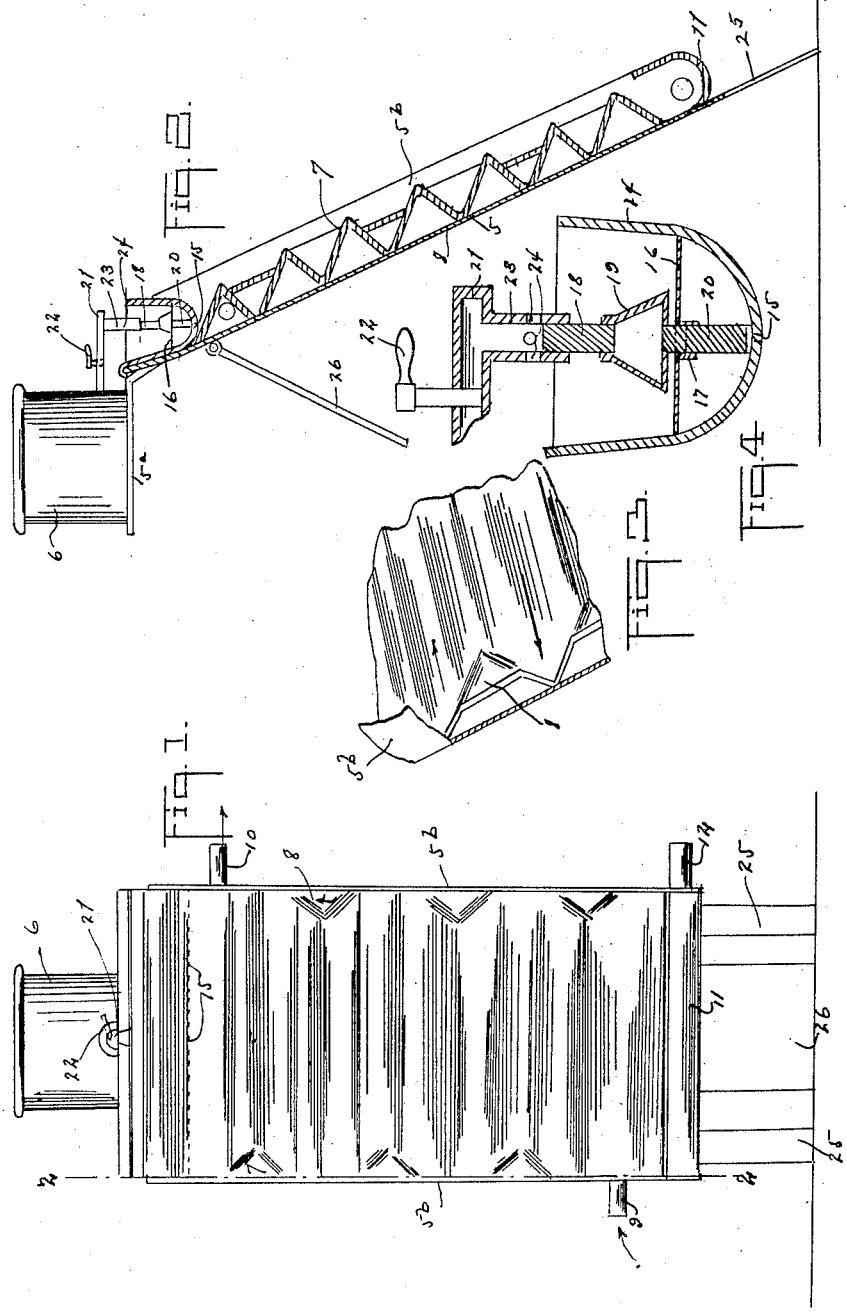

WILLIAM S. BECKETT, OF NORWICH, ONTARIO, CANADA.

MILK-COOLER.

1,357,938.  Specification of Letters Patent.  Patented Nov. 9, 1920.

Application filed September 18, 1919. Serial No. 324,447.

*To all whom it may concern:*

Be it known that I, WILLIAM S. BECKETT, a citizen of the Dominion of Canada, residing at Norwich, in the county of Oxford and Province of Ontario, have invented certain new and useful Improvements in Milk-Coolers, of which the following is a specification.

This invention relates to milk coolers, particularly to that design of coolers where a flow of water is used for cooling the milk as it flows over a corrugated surface.

A further object is to provide a milk cooler of cheap construction and one in which the parts can be easily separated for washing.

A further object is to provide an automatic controlling means for governing the flow of milk from the container to the corrugated portion of the cooler.

With these and other objects in view, the invention consists in the contruction, combination and arrangement of parts as will be hereinafter fully described, illustrated in the accompanying drawings, and pointed out in the claims hereunto appended.

Figure 1 is a front elevation of my invention,

Fig. 2 is a side sectional view taken on the line 2—2 of Fig. 1,

Fig. 3 is a sectional view of the corrugated surface of my invention, over which the milk flows while cooling, and Fig. 4 is an enlarged view of the automatic controlling means which controls the inflow of milk to the spreader chamber from the container.

Referring to the drawings like numerals designate like parts in the various drawings.

5 indicates the main frame or back plate on which the rest of the cooler is carried. This back plate 5 is bent at 5$^a$ so as to form a seat or rest for a container 6 which may be of any desired shape or size required. The sides of the plate 5 are bent outwardly as at 5$^b$ to form sides for the downward flow of the milk over the corrugated surface hereinafter mentioned. 7 indicates a corrugated plate attached to the outer face of the plate 5. Alternating from end to end the downward groove is inwardly cut V-shaped from the top of the ridge to the bottom of the groove and a triangular plate 8 is soldered or otherwise attached to the V-shaped sides and the sides 5$^b$. 9 and 10 are respectively intake and outlet water pipes and by the direction of the arrows as shown more particularly in Fig. 1, this will indicate the direction of the flow of the water under the corrugated surface 7. By having the water flow from the bottom upwardly, the entire space under the corrugated plate 7 is filled with water and must be kept filled before there is an overflow through the pipe 10. If the water were fed in through the pipe 10, there would be no hold-back and the water might flow out of the pipe 9 quicker than it came in through the pipe 10, thus leaving air or vacuum under the corrugated plate 7, which will not act as a cooler the same as having the full flow of water passing thereunder. The bottom end 11 of the corrugated plate 7 is bent to form a U-shaped holder in which the milk is held after flowing over the corrugated plate 7 and it then passes out through the outlet pipe 12 to any desired container or bottle filler.

14 is a U-shaped member detachably held at the upper end of the corrugated surface 7, which member is termed a spreader as it is provided with holes 15 on its under surface through which the milk is spread evenly over the outer face of the corrugated surface 7.

Transverse centrally of the spreader 15, I provide a guide bar 16, which is formed with a strip of metal having a downwardly punched opening 17. 18 is a stopper cylindrical in shape and provided with a frusto-conical float at its lower end and a guide 20 positioned centrally of the float 19 so as to coöperate through the opening 17 in the guide bar 16 to keep the stopper in a perpendicular position. The container 6 is provided with a tap 21 and a shut-off valve 22. The downwardly extending portion 23 of the tap is provided with orifices 24, through which the milk is adapted to flow when coming from the container. The stopper 18 is adapted to fit into the downwardly extending portion 23 as more clearly shown in Fig. 4. After the milk has flown from the container into the spreader 14, for a while it might not run through the openings 15 as quickly as through the tap 21 and therefore if there was not the automatic control, it would overflow. In my invention I provide a hollow float 19 on the stopper 18 so that when the milk rises in the spreader 14, the float will also rise and thus cause the stopper to go upwardly in the downwardly extending portion 23 of the tap 21, so that it will cut off the flow of milk through the orifices 24. As soon as the milk goes down in the mixer 14, the float will descend carrying the stopper with it, so that the orifices are opened again for the flow of milk.

The plate 5 is provided with suitable legs 25 and back rest 26 of any desired form or construction.

From the foregoing it is thought that the construction of my invention will be clearly understood, and therefore a more extended explanation has been omitted.

What I claim as new, is,—

1. A milk cooler consisting of a back plate having its sides bent at right angles thereto and its upper end bent backwardly to form a seat, a corrugated plate mounted on the outer side of said back plate, provisions permitting water to be forced upwardly between said plates, an intake pipe and an outlet pipe, a milk holding trough formed on the lower end of said corrugated plate and provided with an outlet therefrom, a detachable spreader suitably mounted at the upper end of said corrugated plate and provided with suitably spaced openings so as to spread the milk evenly over said corrugated plate, a container suitably positioned on said seat and having an outlet tap extending over said spreader and provided with a shut-off means, an automatic controlling means in said spreader adapted to coöperate with said tap so as to keep an even flow of milk coming from said container and a suitable means for supporting said plate.

2. A milk cooler consisting of a back plate having its sides bent at right angles thereto and its upper end bent backwardly to form a seat, a corrugated plate mounted on the outer side of said back plate, provisions permitting water to be forced upwardly between said plates, a cooling fluid intake pipe and outlet pipe, a milk holding trough formed on the lower end of said corrugated plate and provided with an outlet therefrom, a detachable spreader suitably mounted at the upper end of said corrugated plate and provided with suitably spaced openings so as to spread the milk evenly over said corrugated surface, a container suitably positioned on said seat and having an outlet tap extending over said spreader and provided with a shut-off means, an automatic controlling means in said spreader, said automatic control consisting of a cylindrical shaped stopper mounted on a frusto-conical float, a guide centrally positioned under said float, suitable guide bar positioned on said mixer, the downwardly extending portion of said tap being provided with orifices in its sides, said stopper being adapted to be slidably positioned in said spreader, the said float causing the said stopper to rise and cut off the flow of milk from the said tap, and a suitable means for supporting said plate.

3. In a milk cooler, a back plate formed with a container-support and having its sides bent upwardly to form a trough, a corrugated plate in said trough, the bottom end of said corrugated plate being bent to form a U-shaped milk holder, and a U-shaped spreader at the upper end of the corrugated plate.

4. In a milk cooler, a back plate formed with a container-support and having its sides bent upwardly to form a trough, a corrugated plate in said trough, the bottom end of said corrugated plate being bent to form a U-shaped milk holder, a U-shaped spreader at the upper end of the corrugated plate, and means for automatically controlling the flow of the milk.

In testimony whereof I affix my signature in the presence of two witnesses.

WILLIAM S. BECKETT.

Witnesses:
  J. H. HOFFMAN,
  M. L. BUSHELL.